United States Patent [19]

White

[11] Patent Number: 4,819,484
[45] Date of Patent: Apr. 11, 1989

[54] PORTABLE LIQUID LEVEL GAUGE

[76] Inventor: Michael G. White, 6A Oak Street, Red Deer, Alberta, Canada, T3P 3A1

[21] Appl. No.: 201,011

[22] Filed: Jun. 1, 1988

[30] Foreign Application Priority Data

Jul. 29, 1987 [CA] Canada .................................. 543289

[51] Int. Cl.$^4$ ............................................. G01F 23/30
[52] U.S. Cl. ..................... 73/321; 116/228; 73/309; 73/305
[58] Field of Search ............... 116/278, 276, 228, 282; 73/290 B, 305, 309, 321, 319, 314, 323, 282

[56] References Cited

U.S. PATENT DOCUMENTS

| 56,702 | 7/1866 | Campbell . | |
|---|---|---|---|
| 1,257,693 | 2/1918 | Furman . | |
| 1,379,271 | 5/1921 | Malinowsky | 73/321 |
| 1,512,752 | 10/1924 | Fisk | 73/321 |
| 1,652,377 | 12/1927 | Sartakoff . | |
| 1,886,304 | 11/1932 | Rathbone et al. . | |
| 2,995,824 | 8/1961 | Wells | 73/321 |
| 3,217,541 | 11/1965 | Williamson | 73/321 |
| 3,283,578 | 11/1966 | Moore | 73/321 |
| 3,440,880 | 4/1969 | Hoyer . | |
| 3,555,905 | 1/1971 | George | 73/321 |
| 4,384,486 | 5/1983 | Eckert | 73/321 |
| 4,467,647 | 8/1984 | Yamane et al. | 73/314 |
| 4,610,165 | 9/1986 | Duffy et al. | 73/305 |
| 4,709,653 | 12/1987 | Salomon | 73/321 |

FOREIGN PATENT DOCUMENTS

| 58243 | 12/1897 | Canada . | |
|---|---|---|---|
| 197393 | 2/1920 | Canada . | |
| 510846 | 3/1955 | Canada . | |
| 776396 | 1/1968 | Canada . | |
| 1042227 | 11/1978 | Canada . | |
| 310848 | 1/1930 | Fed. Rep. of Germany | 73/321 |
| 1076587 | 4/1954 | France | 73/321 |
| 409063 | 4/1934 | United Kingdom | 73/321 |

Primary Examiner—William A. Cuchlinski, Jr.
Assistant Examiner—Jeffrey Hohenshell
Attorney, Agent, or Firm—Beveridge, DeGrandi & Weilacher

[57] ABSTRACT

A portable liquid level device is provided for measuring the depth of liquid in a storage tank. The device has a portability similar to that of a regular dip stick, but provides more accurate measurement of liquid level especially with liquids which do not show up clearly on a dip stick. The device has a tube which is open at its lower end and a guideway within the tube along which a float can move. Rollers are mounted near the upper and lower ends of the tube and carry a loop of flexible tape connected to the float. The tape has indicia on its external surface which can be read on a sight glass mounted at the upper end of the tube. All of the moving parts are protected within the tube.

5 Claims, 1 Drawing Sheet

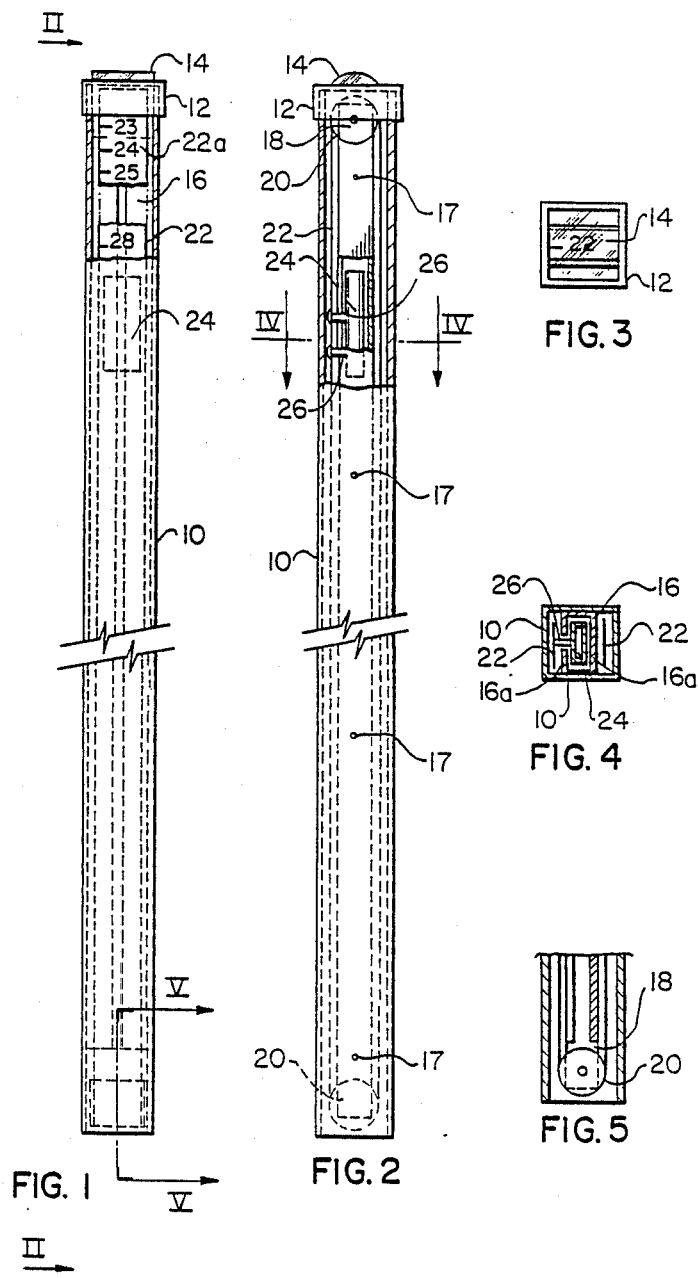

PORTABLE LIQUID LEVEL GAUGE

The present invention provides a portable liquid level gauge especially useful for measuring the level of gasoline in an underground storage tank.

Typically, service stations have three to six underground storage tanks for gasoline. Presently, measurement of the depth of gas in the tanks is done with a wooden dip stick which is up to 14 feet in length and which is painted and graduated with markings along its length. Various problems arise however with the use of such a tool. For example, gasoline is very volatile and evaporates quickly, so that the high liquid mark is not readily observable especially in poor light. On the other hand, diesel fuel is stable but is not easily cleaned from the tool.

Liquid level gauges are known which are permanently installed in such storage tanks. A design for one such gauge is shown in U.S. Pat. No. 3,555,905, which issued Jan. 19, 1971 to George. It is however relatively expensive to have a gauge of this kind in each tank. Furthermore, the gauge shown in the George patent is not suitable for use as a portable device since it has a float which slides externally of a tube so that if the device were to be moved from one tank to another damage to the float or to the sliding surface of the tube would be likely.

The present invention provides a liquid level gauge which is readily portable, so that it can be moved from one tank to another like a dip stick. As in the George design, it uses a tape which is movable by a float so that the liquid level can be read off directly at the top of the gauge when the gauge is in place in the tank. Unlike with the George device, the float and in fact all of the moving parts are enclosed inside a tube and are therefore not subject to damage.

More specifically, the present invention provides a readily portable liquid level gauge comprising a tube having an upper and a lower end and an opening for liquid at the lower end. A guideway within the tube guides a float for longitudinal movement. At each of the upper and lower ends of the tube a roller is provided, and a loop of flexible tape is held taut between the rollers and has indicia on its outer surface which can be viewed through viewing means adjacent the upper end of the tube. The tape has a connection to the float such that liquid in the tube can lift the float and cause corresponding movement of the tape, this connection being eccentric of the float, and the guideway being such as to maintain alignment of the float such as to prevent its jamming.

The guideway may be constituted by an extrudable member which largely surrounds the float, with the tape lying outside the guideway and being connected to the float by connection means movable within a slot in the guideway.

The invention will be more particularly described by way of example with reference to the embodiment shown in the accompanying drawings, in which:

FIG. 1 shows a partly sectioned side elevation of a gauge,

FIG. 2 shows a further largely broken away elevation of the gauge taken on the lines II—II of FIG. 1;

FIG. 3 shows a top view of the gauge;

FIG. 4 shows a cross-sectional view of the gauge on lines IV—IV of FIG. 2; and

FIG. 5 shows a partial sectional elevation view of the bottom end of the gauge, on lines V—V of FIG. 1.

Referring to the drawings, the gauge device comprises a square tube 10 having an open lower end and having a square cap 12 closing the top end; this cap holds a convex sight glass 14. The length of the tube may be 14 feet. A vent hole (not shown) is provided near the upper end of the tube.

Fixed within tube 10 is a guideway formed by an extruded aluminum member 16 having opposed sides fixed, as by rivets 17, to the inner surfaces of the sides of the tube 10, such that its front and rear faces 16a are spaced from the front and rear inner surfaces of the tube. These front and rear faces 16a terminate short of the top and bottom of the tube 10 and extensions 18 of the sides of member 16 carry shafts with freely rotatable rollers 20. Rollers 20 are of suitable diameter for supporting a readily flexible tape 22 such that the tape is held as a taut loop between the rollers and is free to move around the rollers between the front and rear faces 16a of the guide member and adjacent inner surfaces of the tube 10. The tape 22 has indicia shown at 22a on its external surface, as with a measuring tape.

Within the member 16 is mounted a longitudinally slidable float 24, this being hollow and formed of plastics such as polyvinyl chloride, and being such as to have good buoyancy in gasoline and also being resistant to attack by gasoline or diesel fuels. The float 24 is attached to tape 22 by screw means indicated at 26 in FIG. 4 which pass through a slot in the front face of the guideway member 16.

The device can be moved from one tank to another, like with a dip stick, to measure the level of liquid such as gasoline or diesel oil. When inserted into a tank, the float 24 rests at the top surface of the liquid so that the indicia 22a on the tape which is viewed through the sight glass 14 indicates the level of liquid in the tank. The fact that all moving parts are surrounded by the tube 10 means that the device can be moved around from one tank to another with little prospect of any serious damage occurring. The guideway 16 is a close sliding fit and maintains proper alignment of the float so that even with the connection between the float and the tape being eccentic relative to the float, the float is maintained in alignment and does not jam in the guideway.

I claim

1. A readily portable liquid level gauge for measuring liquid levels in tanks, comprising a tube having an upper and a lower end and having an opening for liquid at the lower end, a guideway totally within said tube and having a float guided for longitudinal rectilinear movement in said guideway, a roller rotatably supported adjacent each of the upper and lower ends of the tube, and a loop of flexible tape held taut by said rollers and having indicia on its outer surface, said tape having a connection to said float which is eccentric of the float and such that liquid in the tube can lift the float and cause corresponding movement of the tape, the guideway maintaining alignment of the float such as to prevent jamming in spite of said eccentric connection; and viewing means allowing observation of the indicia on the tape to indicate the level of liquid in the tube.

2. The liquid level gauge of claim 1 wherein said guideway is constituted by an extrudable member within said tube which member largely surrounds the float, the tape lying outside the guideway and being connected to the float by connection means movable within a slot in said guideway.

3. The liquid level gauge of claim 1 wherein said viewing means is a sight glass at the top end of the tube.

4. The liquid level gauge of claim 1 wherein said guideway, float, rollers and tape are entirely enclosed within said tube.

5. The liquid level gauge of claim 2 wherein said guideway, float, rollers and tape are entirely enclosed within said tube.

* * * * *